United States Patent
Bakhsh et al.

(10) Patent No.: US 6,431,590 B1
(45) Date of Patent: Aug. 13, 2002

(54) INFLATABLE SIDE CURTAIN

(75) Inventors: Ali Emam Bakhsh, Rochester Hills; Ayad G. Nayef, Sterling Heights; Russell E. Stein, Leonard; Paul A. Bowers, Ray, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/946,287

(22) Filed: Sep. 5, 2001

Related U.S. Application Data

(63) Continuation of application No. 09/672,547, filed on Sep. 28, 2000, now abandoned.

(51) Int. Cl.7 ............................................. B60R 21/22
(52) U.S. Cl. .................. 280/730.2; 280/729; 280/743.2
(58) Field of Search ............................ 280/729, 730.1, 280/730.2, 743.1, 743.2, 742

(56) References Cited

U.S. PATENT DOCUMENTS

| | | |
|---|---|---|
| 3,731,949 A | 5/1973 | Radke |
| 5,378,019 A * | 1/1995 | Smith et al. ............. 280/743.1 |
| 5,427,410 A | 6/1995 | Shiota et al. |
| 5,439,247 A | 8/1995 | Kolb |
| 5,524,924 A | 6/1996 | Steffens, Jr. et al. |
| 5,588,672 A | 12/1996 | Karlow et al. |
| 5,730,463 A | 3/1998 | Fisher et al. |
| 5,788,270 A | 8/1998 | Haland et al. |
| 5,865,462 A | 2/1999 | Robins et al. |
| 5,884,937 A | 3/1999 | Yamada |
| 5,899,490 A | 5/1999 | Wipasuramonton et al. |
| 5,899,491 A | 5/1999 | Tschaeschke |
| 5,924,723 A | 7/1999 | Brantman et al. |
| 5,957,487 A | 9/1999 | Stütz |
| 5,960,611 A | 10/1999 | Aigner et al. |
| 6,010,149 A | 1/2000 | Riedel et al. |
| 6,032,977 A | 3/2000 | Reh et al. |
| 6,056,316 A | 5/2000 | Yamaji et al. |
| 6,073,961 A | 6/2000 | Bailey et al. |
| 6,082,761 A | 7/2000 | Kato et al. |
| 6,135,492 A | 10/2000 | Zimmerbeutel et al. |
| 6,155,596 A | 12/2000 | Nakajima et al. |
| 6,168,191 B1 | 1/2001 | Webber et al. |
| 6,170,860 B1 | 1/2001 | Denz et al. |
| 6,186,534 B1 | 2/2001 | Heinz |
| 6,199,898 B1 | 3/2001 | Masuda et al. |
| 6,220,625 B1 | 4/2001 | Wallner et al. |
| 6,234,516 B1 | 5/2001 | Boxey |
| 6,237,937 B1 | 5/2001 | Kokeguchi et al. |
| 6,244,619 B1 * | 6/2001 | Satzger ................... 280/730.2 |
| 6,250,668 B1 | 6/2001 | Breed et al. |
| 6,273,456 B1 * | 8/2001 | Heigl ....................... 280/730.2 |

FOREIGN PATENT DOCUMENTS

| | | |
|---|---|---|
| DE | 4134995 | 3/1993 |
| DE | 4307175 | 9/1993 |
| DE | 19743626 | 10/1996 |
| DE | 29914637 | 1/2000 |
| GB | 2314300 | 12/1997 |

* cited by examiner

*Primary Examiner*—J. J. Swann
*Assistant Examiner*—David R. Dunn
(74) *Attorney, Agent, or Firm*—Tarolli, Sundheim, Covell, Tummino & Szabo L.L.P.

(57) ABSTRACT

An apparatus (10) comprises an inflatable protection device (14) inflatable between the side structure (16) of a vehicle (12) and a vehicle occupant. The device (14) includes at least one inflatable front chamber (120), rear chamber (150), and middle chamber (100). The front chamber (120) and the rear chamber (150) each have an inflation fluid inlet (122 and 152) near an upper edge (50) of the device (14) and an inflation fluid outlet (124 and 154). The middle chamber (100) has at least one inflation fluid inlet (102, 104) near the lower edge (52) and is free from inlets near the upper edge (50). Inflation fluid enters the front and rear chambers (120 and 150) through the inlets (122 and 152) and exits through the outlets (124 and 154) into the inflation fluid inlets (102, 104) of the middle chamber (100) to inflate the middle chamber.

25 Claims, 4 Drawing Sheets

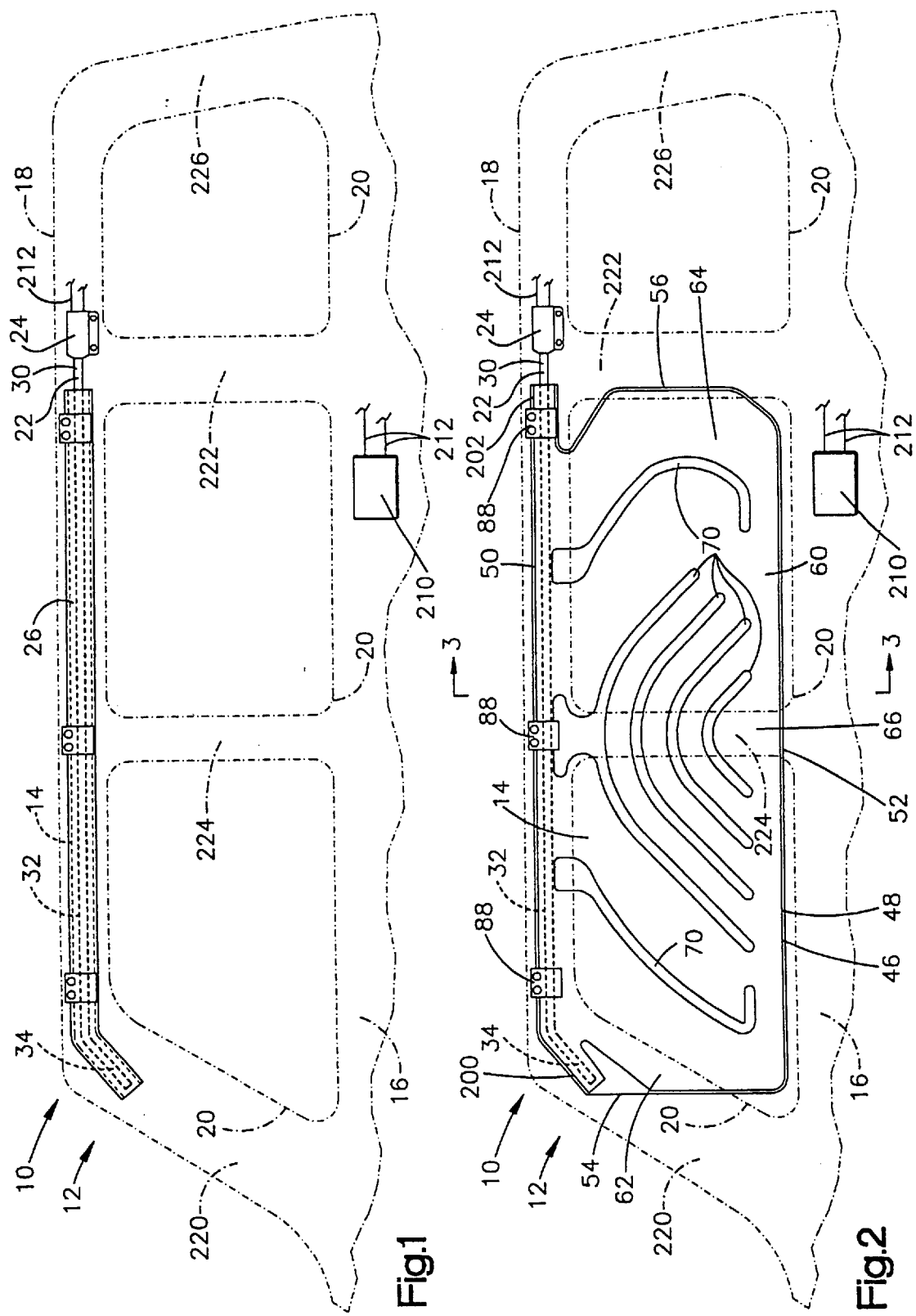

INFLATABLE SIDE CURTAIN

RELATED APPLICATIONS

This application is a continuation of U.S. patent application Ser. No. 09/672,547, filed Sep. 28, 2000, now abandoned.

FIELD OF THE INVENTION

The present invention relates to an apparatus for helping to protect an occupant of a vehicle in the event of a side impact to the vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment in the event of a side impact or a vehicle rollover. The inflatable curtain, when inflated, is positioned between a vehicle occupant and the side structure of the vehicle. A known inflatable curtain is inflated by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus includes an inflatable vehicle occupant protection device that is inflatable away from the vehicle roof into a position between the side structure of the vehicle and a vehicle occupant. An inflation fluid source provides inflation fluid for inflating the inflatable vehicle occupant protection device. The inflatable vehicle occupant protection device includes overlying panels interconnected to form a perimeter connection extending along a perimeter of the inflatable vehicle occupant protection device. The perimeter is partially defined by upper and lower edges of the inflatable vehicle occupant protection device and front and rear portions spaced apart along the upper and lower edges.

The inflatable vehicle occupant protection device also includes at least one connection that interconnects the overlying panels within the perimeter. The connection helps to define at least one inflatable front chamber located in the front portion, at least one inflatable rear chamber located in the rear portion, and at least one inflatable middle chamber located between the front and rear chamber. The front and rear chambers each have an inflation fluid inlet positioned near the upper edge of the inflatable vehicle occupant protection device and an inflation fluid outlet located near the lower edge of the inflatable vehicle occupant protection device. The middle chamber has at least one inflation fluid inlet positioned near the lower edge of the inflatable vehicle occupant protection device and is free from inflation fluid inlets near the upper edge of said inflatable vehicle occupant protection device.

The inflation fluid inlets direct inflation fluid from the inflation fluid source into the front and rear chambers. The inflation fluid outlets direct inflation fluid from the front and rear chambers into the inflation fluid inlet of said middle chamber to inflate the middle chamber.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view illustrating an apparatus for helping to protect a vehicle occupant in a deflated condition, according to a first embodiment of the present invention;

FIG. 2 is a schematic view of the apparatus of FIG. 1 in an inflated condition;

DESCRIPTION OF PREFERRED EMBODIMENTS

Figure 3:
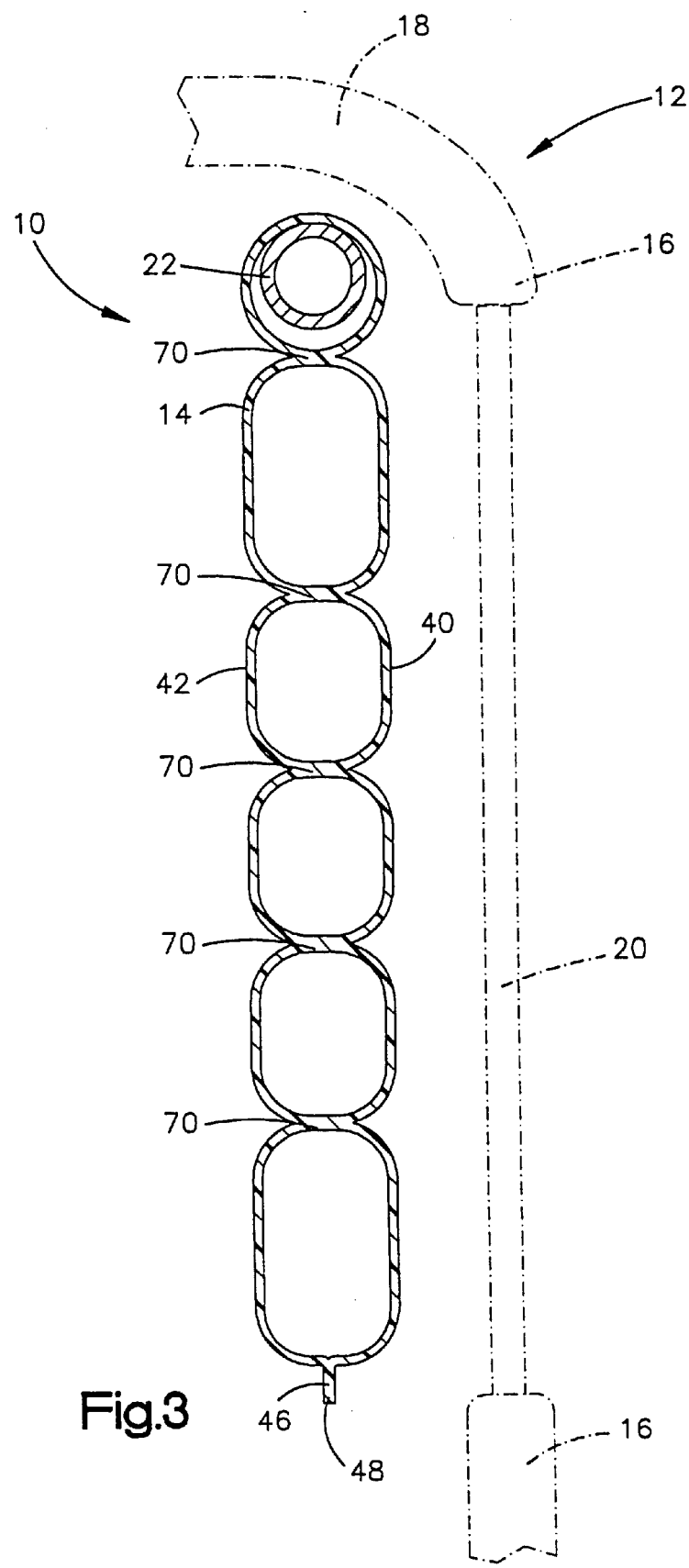
FIG. 3 is a sectional view of the apparatus taken generally along line 3—3 in FIG. 2.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 disposed in the inflatable curtain 14. The second end portion 32 of the fill tube 22 has a plurality of openings (not shown) that provide fluid communication between the fill tube 22 and the inflatable curtain 14. The second end portion 32 includes an angled portion 34 that extends at an acute angle from the remainder of the fill tube 22.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 22 could be of any suitable type or construction for supplying a medium for inflating the inflatable curtain 14.

The apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 18 and along the side structure 16 of the vehicle 12 above the side windows 20.

Referring to FIG. 3, the inflatable curtain 14 comprises first and second panels 40 and 42 that are arranged in an overlying manner. The first and second panels 40 and 42 are interconnected to form a perimeter connection 46 (FIGS. 2 and 3) that extends along a perimeter 48 of the panels. The first and second panels 40 and 42 are also interconnected to form connections 70 within the perimeter 48 of the inflatable curtain 14.

In a preferred construction of the inflatable curtain 14, the perimeter connection 46 and the connections 70 are formed by weaving the panels 40 and 42 together. In alternative constructions of the inflatable curtain 14, means such as stitching, dielectric sealing, ultrasonic bonding, heat sealing, and adhesives may be used to interconnect the first and second panels 40 and 42 in order to form the perimeter connection 46 and the connections 70.

In the preferred construction of the inflatable curtain 14, the curtain is formed by weaving the first and second panels 40 and 42 simultaneously while also interweaving the perimeter connection 46 and the connections 70 as single layers of fabric. This can be accomplished by using a Jacquard or Dobby weaving machine. The weaving machines are pre-programmed to weave the first and second panels 40 and 42 along with the perimeter connection 46 and connections 70 at the same time. No intermediate steps are required.

In the alternative construction of the inflatable curtain 14, the curtain may be formed by interconnecting two separate fabric pieces together along the perimeter connection 46 and the connections 70. As a further alternative, a single piece of fabric may be folded over to form the overlying first and second panels 40 and 42. In this latter alternative, the fold is part of the perimeter connection 46 of the inflatable curtain 14.

Preferably, the inflatable curtain 14 is constructed of a woven fabric, such as nylon, that is coated with a gas impermeable material, such as urethane or silicone. The inflatable curtain 14 thus may have a substantially gas-tight construction. Other materials, such as elastomers, plastic films, or combinations thereof, may also be used to construct the inflatable curtain 14, in which case the curtain may have a non-woven construction. The materials used to construct the inflatable curtain 14 may also be single or multi-layered materials.

The first and second panels 40 and 42, the perimeter connection 46, and the connections 70 may be coated using a laminate film, slurry, and/or a spray coating, such as silicone, urethane, or other known suitable materials, in order to achieve a substantially gas-tight construction. This helps to prevent gas from permeating directly through the first and second panels 40 and 42, the perimeter connection 46, and the connections 70.

The perimeter 48 (FIG. 2) of the inflatable curtain 14 is defined by upper and lower edges 50 and 52, respectively, of the curtain and front and rear edges 54 and 56, respectively, of the curtain that are spaced apart horizontally along the upper and lower edges. The perimeter connection 46 (FIG. 2) defines an inflatable volume 60 of the inflatable curtain 14.

The front and rear edges 54 and 56 of the inflatable curtain 14 partially define front and rear portions 62 and 64, respectively, that are spaced apart horizontally along the upper and lower edges 50 and 52 and extend between the upper and lower edges. A middle portion 66 of the inflatable curtain 14 is positioned between the front and rear portions 62 and 64 of the inflatable curtain 14 and extends between the upper and lower edges 50 and 52 of the curtain.

As illustrated in FIG. 2, the front and rear edges 54 and 56 extend between the upper and lower edges 50 and 52. The front and rear edges 54 and 56 could, however, be omitted and the upper and lower edges 50 and 52 could be curved and extended until they intersect, in which case the front and rear portions 58 and 60 would be partially defined by the intersecting upper and lower edges.

Figure 4:
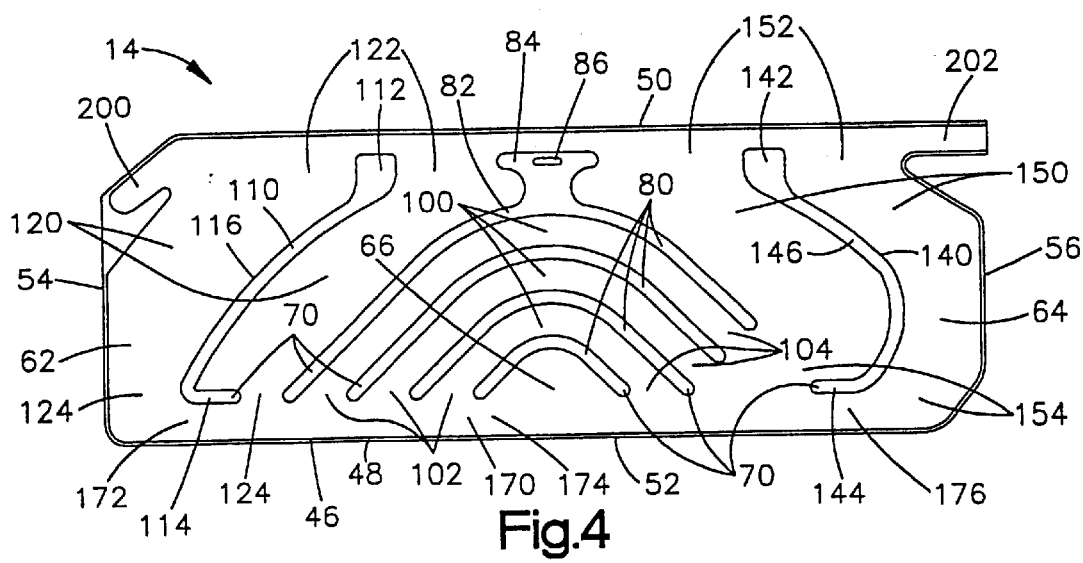
FIG. 4 is a schematic view of a portion of the apparatus of FIG. 2.

Referring to FIG. 4, the inflatable curtain 14 includes four middle connections 80 located in the middle portion 66 of the curtain. The middle connections 80 are generally arc-shaped, concentric, and are positioned facing concavely downward, as viewed in FIG. 4, toward the lower edge 52 of the inflatable curtain 14. A first middle connection 82 includes a generally T-shaped portion 84 that extends towards the upper edge 50 of the inflatable curtain 14 from a position proximate the apex of the arc-shaped first middle connection. The portion 84 may include an aperture 86 for receiving a fastening device 88 (FIG. 2), such as a clamp, for connecting the inflatable curtain 14 and the fill tube 22 to the vehicle 12.

The middle connections 80 (FIG. 4) help to define three inflatable middle chambers 100 located in the middle portion 66 of the inflatable curtain 14. The middle chambers 100 are generally arc-shaped, concentric, and are positioned facing concavely downward, as viewed in FIG. 4, toward the lower edge 52 of the inflatable curtain 14. Each of the middle chambers 100 includes first and second inflation fluid inlets 102 and 104, respectively. The first and second inflation fluid inlets 102 and 104 are positioned at opposite ends of the middle chambers 100 and near the lower edge 52 of the inflatable curtain 14. None of the first and second inflation fluid inlets 102 and 104 is positioned near the upper edge 50 of the inflatable curtain 14.

The inflatable curtain 14 also includes a front connection 110 located in the front portion 62 of the curtain. The front connection 110 includes an upper end portion 112, a lower end portion 114 and a middle portion 116 that extends between the upper and lower end portions. The upper end portion 112 is positioned near the upper edge 50 of the inflatable curtain 14 and extends generally parallel to the upper edge of the curtain. The upper end portion 112 may include an aperture (not shown) for receiving a fastening device. The lower end portion 114 (FIG. 4) is positioned near the lower edge 52 of the inflatable curtain 14 and extends generally parallel to the lower edge of the curtain towards the middle portion 66 of the curtain. The middle portion 116 of the front connection 110 is curved and extends generally diagonally between the upper and lower end portions 112 and 114.

The front connection 110, perimeter connection 46, and the first middle connection 82 help to define two inflatable front chambers 120 located in the front portion 62 of the inflatable curtain 14. The front chambers 120 extend generally diagonally from near the upper edge 50 of the inflatable curtain 14 to near the lower edge 52 of the curtain. Each of the front chambers 120 includes an inflation fluid inlet 122 positioned near the upper edge 50 of the inflatable curtain 14 and an inflation fluid outlet 124 positioned near the lower edge 52 of the curtain.

The inflatable curtain 14 also includes a rear connection 140 located in the rear portion 64 of the curtain. The rear connection 140 includes an upper end portion 142, a lower end portion 144 and a middle portion 146 that extends between the upper and lower end portions. The upper end portion 142 is positioned near the upper edge 50 of the inflatable curtain 14 and extends generally parallel to the upper edge of the curtain. The upper end portion 142 may include an aperture (not shown) for receiving a fastening device. The lower end portion 144 (FIG. 4) is positioned near the lower edge 52 of the inflatable curtain 14 and extends generally parallel to the lower edge of the curtain towards the middle portion 66 of the curtain. The middle portion 146 of the rear connection 140 is curved and extends generally diagonally between the upper and lower end portions 142 and 144.

The rear connection 140, perimeter connection 46, and the first middle connection 82 help to define two inflatable rear chambers 150 located in the rear portion 64 of the inflatable curtain 14. The rear chambers 150 extend from near the upper edge 50 of the inflatable curtain 14 to near the lower edge 52 of the curtain. The rear chamber 150 adjacent the middle portion 66 extends generally diagonally, whereas the rear chamber adjacent the rear edge 56 extends in a generally curved manner. Each of the rear chambers 150 includes an inflation fluid inlet 152 positioned near the upper edge 50 of the inflatable curtain 14 and an inflation fluid outlet 154 positioned near the lower edge 52 of the curtain.

The inflatable curtain 14 also includes a bottom chamber 170 that extends along the lower edge 52 of the curtain from the front edge 54 of the curtain to the rear edge 56 of the curtain. The bottom chamber 170 has a portion 172 located in the front portion 62 of the inflatable curtain 14 adjacent the inflation fluid outlets 124 of the front chambers 120. The bottom chamber 170 has another portion 174 located in the middle portion 66 of the inflatable curtain 14 adjacent the first and second inflation fluid inlets 102 and 104 of the middle chambers 100. The bottom chamber 170 also has a portion 176 located in the rear portion 64 of the inflatable curtain 14 adjacent the inflation fluid outlets 154 of the rear chambers 150.

As illustrated in FIGS. 2 and 4, the inflatable curtain 14 includes a pocket 200 for receiving the angled portion 34 of the second end portion 32 of the fill tube 22. The pocket 200 is defined by a portion of the perimeter connection 46 adjacent the intersection of the front edge 54 and the upper edge 50 of the inflatable curtain 14. The pocket 200 surrounds the angled portion 34 of the fill tube 22 and forms a snug fit with the fill tube. The pocket 200 thus helps to position the fill tube 22 in the inflatable curtain 14 and helps to maintain the position of the fill tube relative to the curtain.

The inflatable curtain 14 also includes an opening 202 for supporting the first end portion 30 of the fill tube 22. The opening 202 is positioned adjacent the intersection of the rear edge 56 and the upper edge 50 of the inflatable curtain 14. The opening 202 is defined by portions of the perimeter connection 46 adjacent the intersection of the upper edge 50 and the rear edge 52 of the inflatable curtain 14. The opening 202 receives the fill tube 22 when the fill tube is inserted into the inflatable curtain 14. When the fill tube 22 is fully inserted in the inflatable curtain 14, the portions of the curtain that define the opening 202 encircle the first end portion 30 of the fill tube 22 and form a snug fit with the fill tube. The opening 202 thus helps to position the fill tube 22 in the inflatable curtain 14 and helps to maintain the position of the fill tube relative to the curtain.

The upper end portions 112 and 142 of the front and rear connections 110 and 140 are spaced apart from the upper edge 50 of the inflatable curtain 14 a distance slightly larger than the diameter of the fill tube 22. The upper end portions 112 and 142 thus help guide the fill tube 22 into the inflatable curtain 14 when the tube is inserted into the curtain. The upper end portions 112 and 142 also help to position the fill tube 22 in the inflatable curtain 14 and help to maintain the position of the fill tube relative to the curtain.

The vehicle 12 includes a sensor mechanism 210 (shown schematically in FIGS. 1 and 2) for sensing a side impact to the vehicle 12 and/or a rollover of the vehicle 12. The sensor mechanism 210 actuates the inflator 24 in response to the sensing of a side impact or a vehicle rollover.

In the event of a rollover of the vehicle 12 or a side impact to the vehicle of a magnitude greater than a predetermined threshold value, the sensor mechanism 210 provides an electrical signal over lead wires 212 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 (FIG. 1) opens and the inflatable curtain 14 (FIG. 2) inflates away from the roof 18 in a downward direction as shown in the drawings and in a downward direction with respect to the direction of forward travel of the vehicle 12 into the position illustrated in FIG. 2.

The inflatable curtain 14, when inflated, extends along the side structure 16 of the vehicle 12 and is positioned between the side structure and any occupant of the vehicle. When the inflatable curtain 14 is in the inflated condition, the first panel 40 (FIG. 3) is positioned adjacent the side structure 16 of the vehicle 12. The upper edge 50 (FIG. 2) of the inflatable curtain 14 is positioned adjacent the intersection of the roof 18 and the side structure 16 of the vehicle 12. The front edge 54 of the inflatable curtain 14 is positioned adjacent an A pillar 220 of the vehicle 12. The rear edge 56 of the inflatable curtain 14 is positioned adjacent a C pillar 222 of the vehicle 12. The inflatable curtain 14 extends between the A pillar 220 and the C pillar 222 of the vehicle 12 and overlies at least a portion of the A pillar, C pillar, and a B pillar 224 of the vehicle.

It will be recognized by those skilled in the art that the inflatable curtain may have alternative configurations. For example, in the illustrated embodiment, the inflatable curtain 14 extends between the A pillar 220 and the C pillar 222 of the vehicle 12. The inflatable curtain 14 could, however, extend between the A pillar 220 and the B pillar 224 only or between the B pillar and the C pillar 222 only. Also, the inflatable curtain 14 could extend between the A pillar 220 and a D pillar 226 of the vehicle.

The inflatable curtain 14, when inflated, helps to protect a vehicle occupant in the event of a vehicle rollover or a side impact to the vehicle 12. The connections 70 help to limit the thickness of the inflated inflatable curtain 14 and help to reduce the overall volume of the curtain. The front chambers 120 (FIG. 4), middle chambers 100, rear chambers 150, and bottom chamber 170, when inflated, help to absorb the energy of impacts with the inflatable curtain 14 and help to distribute the impact energy over a large area of the curtain.

As the inflatable curtain 14 is inflated, inflation fluid is directed from the fill tube 22 into the front chambers 120 through the inflation fluid inlets 122 and into the rear chambers 150 through the inflation fluid inlets 152. The inflation fluid inflates the front and rear chambers 120 and 150 and then exits the chambers through the inflation fluid outlets 124 and 154. When the inflation fluid exits the front and rear chambers 120 and 150, the fluid is directed into the bottom chamber 170 and through the first and second inflation fluid inlets 102 and 104 into the middle chambers 100. The lower end portions 114 and 144 of the front and rear connections 110 and 140 may help to direct the inflation fluid towards the middle chambers 100.

As the inflatable curtain 14 is inflated, the front and rear chambers 120 and 150 begin to inflate before the middle chambers 100 begin to inflate. Moreover, the front and rear chambers 120 and 150 may be substantially inflated before the middle chambers 100 begin to inflate. The front and rear portions 62 and 64 of the inflatable curtain 14 are thus inflated before the middle portion 66 of the curtain is inflated.

Figure 5:
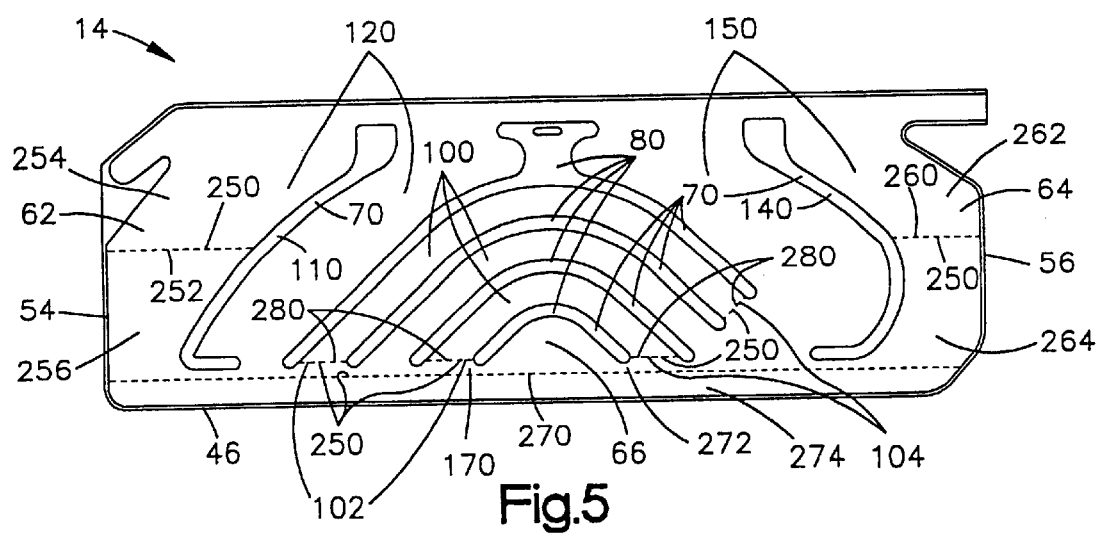
FIGS. 5 and 6 are schematic views of a portion of the apparatus of FIG. 2, illustrating different features of the apparatus.
Figure 6:
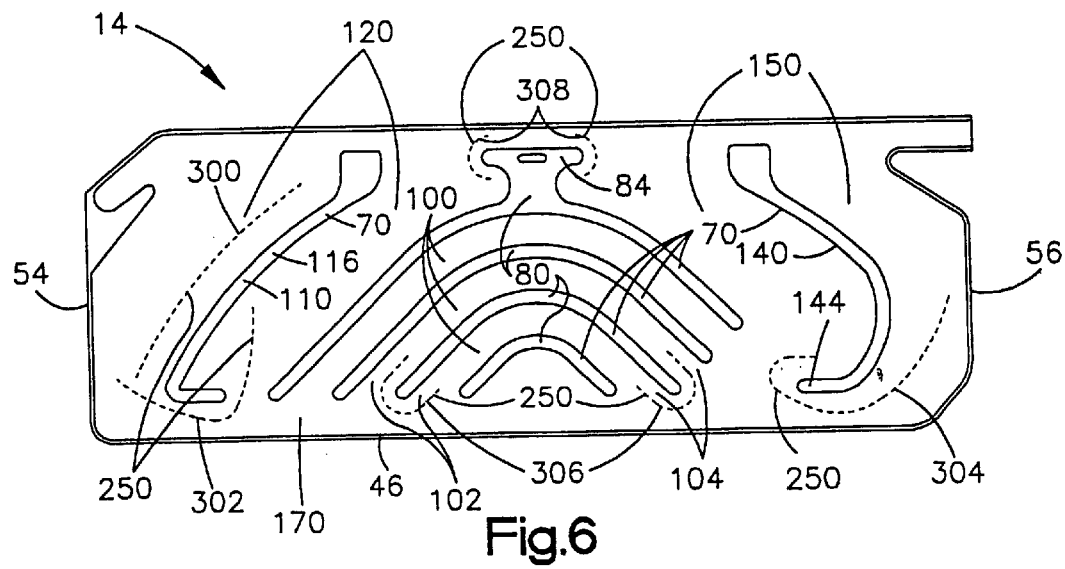

As illustrated in FIGS. 5 and 6, the inflatable curtain 14 may include breakaway seams 250, in addition to the connections 70, that help control the manner in which the front portion 62, middle portion 66, and rear portion 64 of the curtain are inflated. The breakaway seams 250 comprise portions of the first and second panels of the inflatable curtain 14 that are interconnected in a manner such that the seams break when the inflation fluid pressure in the curtain adjacent the seams reaches a predetermined level.

The breakaway seams 250 may have any construction suitable to provide a seam that will break under the pressure of the inflation fluid. For example, in an inflatable curtain 14 having a woven construction, the breakaway seams 250 may be constructed by weaving overlying portions of the curtain panels with a yarn that has a lower denier than the rest of the curtain. Alternatively, in an inflatable curtain 14 having a sewn construction, the breakaway seams 250 may be constructed by sewing overlying portions of the curtain panels with a thread that has a lower denier than the thread used to construct rest of the curtain. The breakaway seams 250 may also be constructed by interconnecting the overlying panels with an adhesive. The breakaway seams 250 may be continuous seams, in which the overlying panels are interconnected continuously along the length of the breakaway seam. Alternatively, the breakaway seams 250 may be intermittent seams, in which the overlying panels are interconnected at predetermined points along the length of the breakaway seam and the panels are unconnected between the predetermined points along the seam.

Referring to FIG. 5, the breakaway seams 250 extend between different connections 70 of the inflatable curtain 14 and between connections of the curtain and the perimeter connection 46 of the curtain. The breakaway seams 250 illustrated in FIG. 5 are preferably continuous seams.

A first breakaway seam 252 extends from the front connection 110 to the perimeter connection 46 adjacent the front edge 54 of the inflatable curtain 14. The first breakaway seam 252 thus divides the front chamber 120 adjacent the front edge 54 into an upper portion 254 and a lower portion 256.

A second breakaway seam 260 extends from the rear connection 140 to the perimeter connection 46 adjacent the rear edge 56 of the inflatable curtain 14. The second breakaway seam 260 thus divides the rear chamber 150 adjacent the rear edge 54 into an upper portion 262 and a lower portion 264.

A third breakaway seam 270 extends from the perimeter connection 46 adjacent the front edge 54 of the inflatable curtain 14 to the perimeter connection adjacent the rear edge 56 of the curtain. The third breakaway seam 270 extends the length of the bottom chamber 170 and thus divides the bottom chamber into an upper portion 272 and a lower portion 274.

Fourth breakaway seams 280 extend between adjacent middle connections 80 effectively to close off or seal the first and second inflation fluid inlets 102 and 104 of the outermost and innermost of the middle chambers 100. The middle chamber 100 between the outermost and innermost middle chambers is free from breakaway connections 250.

As the inflatable curtain 14 is inflated, inflation fluid is directed into the front and rear chambers 120 and 150 of the curtain. Inflation fluid enters the upper portion 254 of the front chamber 120 adjacent the front edge 54 of the inflatable curtain 14 and the upper portion 262 of the rear chamber 150 adjacent the rear edge 56 of the curtain. Inflation fluid enters and passes through the front and rear chambers 120 and 150 adjacent the middle portion 66 of the inflatable curtain 14.

The inflation fluid exiting the front and rear chambers 120 and 150 adjacent the middle portion 66 enters the lower portions 256 and 264 of the front and rear chambers 120 and 150 adjacent the front and rear edges 54 and 56, respectively. The inflation fluid also enters the upper portion 272 of the bottom chamber 170 and the middle chamber 100 that is free from breakaway connections 250.

As the inflatable curtain 14 continues to inflate, inflation fluid pressure builds in the curtain. When the inflation fluid pressure reaches a predetermined level, the breakaway seams 250 break, thus disconnecting the portions of the overlying panels of the inflatable curtain 14. This allows the overlying portions of the panels to move away from each other, which increases the volume of the inflatable curtain 14. This also allows inflation fluid to enter the outermost and innermost middle chambers 100 and the lower portion 274 of the bottom chamber 170.

The front and rear portions 62 and 64 of the inflatable curtain 14 are inflated before the middle portion 66 of the curtain is inflated. The breakaway seams 250 help to further control the manner in which the inflatable curtain 14 is inflated by delaying the inflation fluid from entering certain parts of the curtain, i.e. the outermost and innermost middle chambers 100 and the lower portion 274 of the lower chamber 170. The breakaway seams 250 help to control the volume of the inflatable curtain 14, which helps to achieve a desired curtain pressure rapidly and helps to maintain the desired pressure. The breakaway seams 250 also help to accommodate the variation in inflation fluid pressure caused by differing ambient temperatures. The breakaway seams 250 help to absorb forces on the inflatable curtain 14 caused by inflation of the curtain and/or impacts with the curtain, which helps to prevent failure of the perimeter connection 46 and the connections 70.

Referring to FIG. 6, the breakaway seams 250 extend within the inflatable middle, front, rear and bottom chambers 100, 120, 150 and 170 of the inflatable curtain 14. The breakaway seams 250 do not intersect any of the connections 70 or the perimeter connection 46. The breakaway seams 250 illustrated in FIG. 6 are preferably intermittent seams.

A first breakaway seam 300 extends in the front chamber 120 positioned adjacent the front edge 54 of the inflatable curtain 14. The first breakaway seam 300 extends generally parallel to the middle portion 116 of the front connection 110, essentially dividing the chamber 120 in two.

A second breakaway seam 302 has portions located in both front chambers 120 and in the bottom chamber 170. The second breakaway seam 302 has a generally curved configuration and extends from the front chamber 120 adjacent the front edge 54 of the inflatable curtain 14, through the bottom chamber 170 and into the front chamber adjacent the middle portion 66.

A third breakaway seam 304 has portions located in both rear chambers 150 and in the bottom chamber 170. The third breakaway seam 304 has a generally curved configuration and extends from the rear chamber 150 adjacent the rear edge 56 of the inflatable curtain 14, through the bottom chamber 170 and into the rear chamber adjacent the middle portion 66. The third breakaway seam 304 extends around the lower end portion 144 of the rear connection 140.

A pair of fourth breakaway seams 306 have portions located in the innermost middle chamber 100, the middle chamber 100 adjacent the innermost middle chamber, and the bottom chamber 170. The fourth breakaway seams 306 each have a generally curved configuration. One of the pair of fourth breakaway seams 306 extends from the innermost middle chamber 100 out of the first inflation fluid inlet 102, through the bottom chamber 170, into the first inflation fluid inlet 102 of the adjacent middle chamber 100. The other of the pair of fourth breakaway seams 306 extends from the innermost middle chamber 100 out of the second inflation fluid inlet 104, through the bottom chamber 170, into the second inflation fluid inlet 104 of the adjacent middle chamber 100.

A pair of fifth breakaway seams 308 are located in the front and rear chambers 120 and 150, respectively, adjacent the middle connections 80. The fifth breakaway seams 308 each have a generally curved configuration. One of the pair of fifth breakaway seams 308 extends around the end of the T-shaped portion 84 of the first middle connection 82 located adjacent the front chambers 120. The other of the pair of fifth breakaway seams 308 extends around the end of the T-shaped portion 84 of the first middle connection 82 located adjacent the rear chambers 150.

As the inflatable curtain 14 is inflated, inflation fluid is directed into the front and rear chambers 120 and 150 of the curtain. Because the breakaway seams 250 in FIG. 6 are intermittent seams, inflation fluid may pass around the seams or between the intermittently connected portions of the overlying panels along the seams. Inflation fluid thus fills the front portion 62, rear portion 64 and middle portion 66 of the inflatable curtain 14 and surrounds the breakaway seams 250.

As the inflatable curtain 14 continues to inflate, inflation fluid pressure builds, in the curtain. When the inflation fluid pressure reaches a predetermined level, the breakaway seams 250 break, thus disconnecting the portions of the overlying panels of the inflatable curtain 14. This allows the overlying portions of the panels to move away from each other, which increases the volume of the inflatable curtain 14.

The front and rear portions 62 and 64 of the inflatable curtain 14 are inflated before the middle portion 66 of the curtain is inflated. The breakaway seams 250 help to control further the manner in which the inflatable curtain 14 is inflated by controlling the volume of the curtain. This helps to ensure that a desired curtain pressure is achieved rapidly and maintained. The breakaway seams 250 also help to accommodate the variation in inflation fluid pressure caused by differing ambient temperatures. The breakaway seams 250 also help to absorb forces on the inflatable curtain 14 caused by inflation of the curtain and/or impacts with the curtain, which helps to prevent failure of the perimeter connection 46 and the connections 70.

Those skilled in the art will recognize that the front chambers 120, rear chambers 150, middle chambers 100 and bottom chamber 170 of the inflatable curtain 14 may be defined by connections 70 having shapes and configurations different than those illustrated in FIGS. 1–6. Such connections 70, while having different shapes and configurations, do not prevent controlling inflation of the inflatable curtain 14, i.e., inflating the front and rear portions 62 and 64 before inflating the middle portion 66. Examples of inflatable curtains 14 having connections 70 with different shapes and configurations are illustrated in the embodiments of FIGS. 7 and 8.

Figure 7:
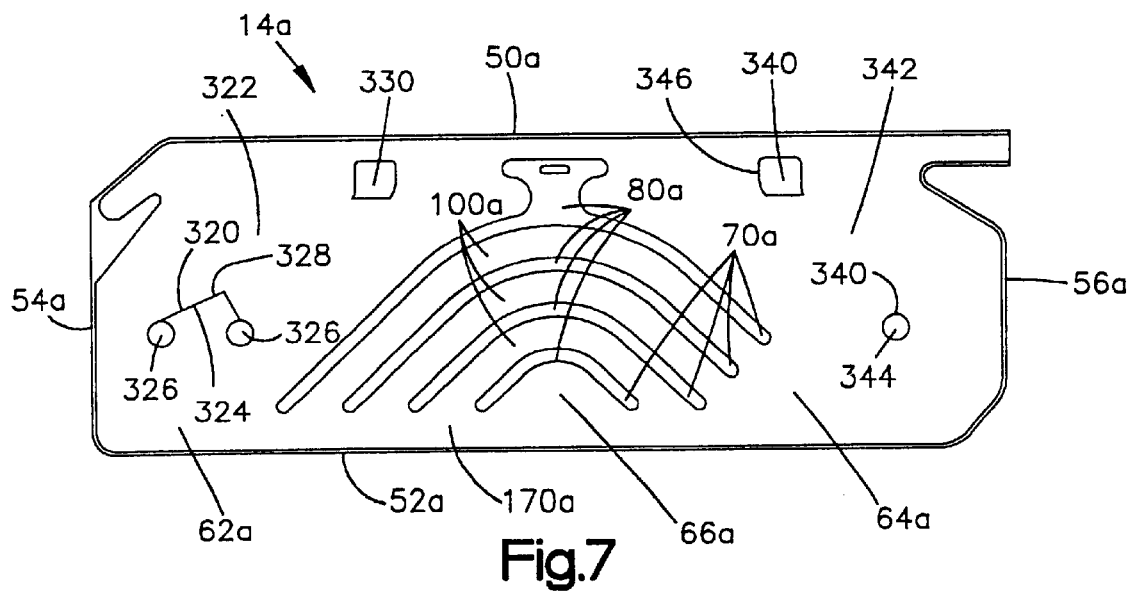
FIG. 7 is a schematic view illustrating a portion of an apparatus for helping to protect a vehicle occupant, according to a second embodiment of the present invention.
Figure 8:
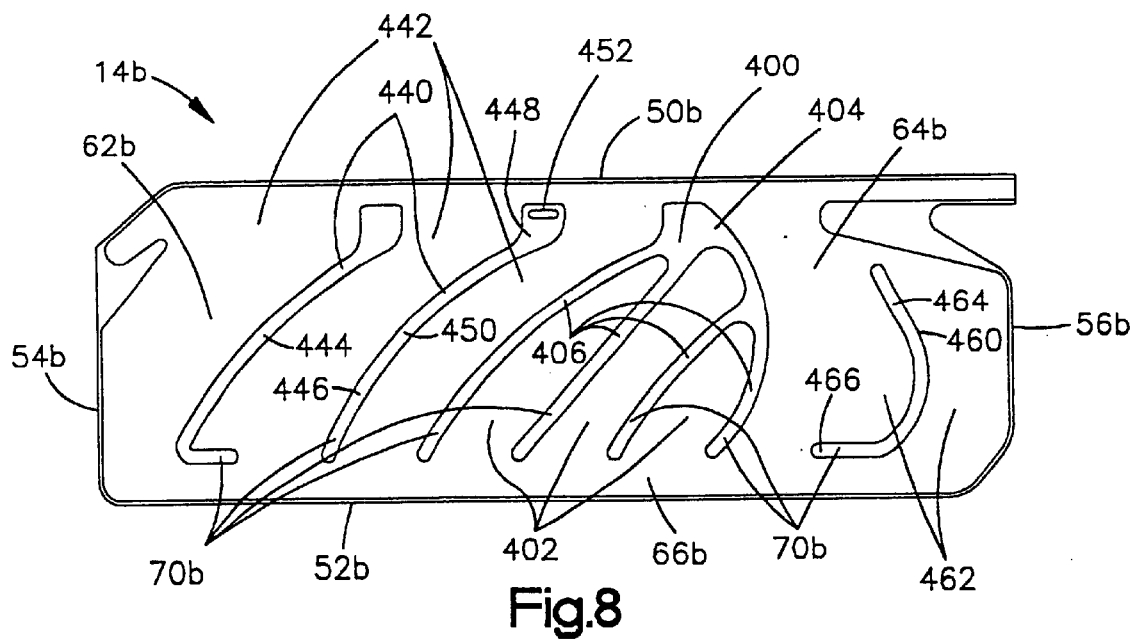
FIG. 8 is a schematic view illustrating a portion of an apparatus for helping to protect a vehicle occupant, according to a third embodiment of the present invention.

A second embodiment of the present invention is illustrated in FIG. 7. The second embodiment of the invention is similar to the first embodiment of the invention illustrated in FIGS. 1–6. Accordingly, numerals similar to those of FIGS. 1–6 will be utilized in FIG. 7 to identify similar components, the suffix letter "a" being associated with the numerals of FIG. 7 to avoid confusion. The inflatable curtain 14a (FIG. 7) of the second embodiment is identical to the inflatable curtain 14 (FIGS. 1–6), except that the connections 70a (FIG. 7) of the second embodiment have a different configuration than the connections 70 (FIGS. 1–6) of the first embodiment.

As illustrated in FIG. 7, the inflatable curtain 14a includes four middle connections 80a configured identically to the middle connections 80 in the embodiments illustrated in FIGS. 1–6. The middle chambers 100a of the embodiment illustrated in FIG. 7 are thus identical to the middle chambers 100 in the embodiments illustrated in FIGS. 1–6. The inflatable curtain 14a illustrated in FIG. 7 also includes front and rear connections 320 and 340 that help to define inflatable front and rear chambers 322 and 342, respectively.

A first front connection 324 includes two round portions 326 aligned horizontally with each other and a linear portion 328 that connects the round portions. The linear portion 328 includes a pair of segments that extend at an acute angle relative to each other. The first front connection 324 is positioned approximately equidistant between the upper and lower edges 50a and 52a of the inflatable curtain 14a, in the front portion 62a of the curtain.

A second front connection 330 is similar to the upper end portion 112 of the front connection 110 of the inflatable curtain 14 illustrated in FIG. 4. The second front connection 330 (FIG. 7) is located near the upper edge 50a of the inflatable curtain 14a, in the front portion 62a of the curtain. The second front connection 330 may help to guide and support the fill tube (not shown in FIG. 7).

A first rear connection 344 has a round shape and is positioned approximately equidistant between the upper and lower edges 50a and 52a of the inflatable curtain 14a, in the rear portion 64a of the curtain. A second rear connection 346 is similar to the upper end portion 142 of the rear connection 140 of the inflatable curtain 14 illustrated in FIG. 4. The second rear connection 346 (FIG. 7) is located near the upper edge 50a of the inflatable curtain 14a, in the rear portion 64a of the curtain. The second rear connection 346 may help to guide and support the fill tube (not shown in FIG. 7).

As the inflatable curtain 14a is inflated, inflation fluid is directed from the fill tube (not shown) into the front and rear chambers 322 and 342. the inflation fluid inflates the front and rear chambers 322 and 342, passes through the chambers, and is directed towards the middle chambers 100a.

As the inflatable curtain 14a is inflated, the front and rear chambers 322 and 342 begin to inflate before the middle chambers 100a begin to inflate. Moreover, the front and rear chambers 322 and 342 may be substantially inflated before the middle chambers 100a begin to inflate. The front and rear portions 62a and 64a of the inflatable curtain 14a are thus inflated before the middle portion 66a of the curtain is inflated.

A third embodiment of the present invention is illustrated in FIG. 8. The third embodiment of the invention is similar to the first embodiment of the invention illustrated in FIGS. 1–6. Accordingly, numerals similar to those of FIGS. 1–6 will be utilized in FIG. 8 to identify similar components, the suffix letter "b" being associated with the numerals of FIG. 8 to avoid confusion. The inflatable curtain 14b (FIG. 8) of the third embodiment is identical to the inflatable curtain 14

(FIGS. 1–6), except that the connections 70b (FIG. 8) of the second embodiment have a different configuration than the connections 70 (FIGS. 1–6) of the first embodiment.

As illustrated in FIG. 8, the inflatable curtain 14b includes a middle connection 400 in the middle portion 66b of the curtain, a pair of front connections 440 in the front portion 62b, and a rear connection 460 in the rear portion 64b. The front connections 440 help to define three front chambers 442 located in the front portion 62b of the inflatable curtain 14b. The middle connection 400 helps to define three middle chambers 402 located in the middle portion 66b of the inflatable curtain 14b. The rear connection 460 helps to define a pair of rear chambers 462 located in the rear portion 64b of the inflatable curtain 14b.

A first front connection 444 is configured identically to the front connection in the embodiments illustrated in FIGS. 1–6. The front chamber 442 positioned adjacent the front edge 54b of the inflatable curtain 14b is thus identical to the front chamber 120 positioned adjacent the front edge 54 of the curtain in the embodiments illustrated in FIGS. 1–6. A second front connection 446 has an upper end portion 448 positioned near the upper edge 50b of the inflatable curtain 14b and a curved portion 450 that extends towards the lower edge 52 of the curtain. The upper end portion 448 may include an aperture 452 for receiving a fastening device (not shown). The upper end portion 448 of the second front connection 446 may also help to guide and support the fill tube (not shown in FIG. 8).

The middle connection 400 has an upper end portion 404 positioned near the upper edge 50b of the inflatable curtain 14b and four finger-like portions 406 that extends towards the lower edge 52b of the curtain along curved paths. The upper end portion 404 may include an aperture (not shown) for receiving a fastening device (not shown). The middle connection 400 may also help to guide and support the fill tube (not shown).

The rear connection 460 has a curved portion 464 and a lower end portion 466 that extends from the curved portion parallel to the lower edge 52b of the inflatable curtain 14b towards the middle portion 66b of the curtain.

As the inflatable curtain 14b is inflated, inflation fluid is directed from the fill tube (not shown) into the front and rear chambers 442 and 462. the inflation fluid inflates the front and rear chambers 442 and 462, passes through the chambers, and is directed towards the middle chambers 402.

As the inflatable curtain 14b is inflated, the front and rear chambers 442 and 462 begin to inflate before the middle chambers 402 begin to inflate. Moreover, the front and rear chambers 442 and 462 may be substantially inflated before the middle chambers 402 begin to inflate. The front and rear portions 62b and 64b of the inflatable curtain 14b are thus inflated before the middle portion 66b of the curtain is inflated.

From the above description of the invention, those skilled in the art will perceive improvements, changes and modifications. For example, in the illustrated embodiments, separate front, middle and rear connections define the front, middle and rear chambers of the inflatable curtain. The front, middle and rear chambers could, however, be defined by a single connection. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant; and an inflation fluid source that provides inflation fluid for inflating said inflatable vehicle occupant protection device;

said inflatable vehicle occupant protection device comprising overlying panels interconnected to form said inflatable vehicle occupant protection device, said inflatable vehicle occupant protection device including connections interconnecting said overlying panels;

said connections helping to define at least one inflatable front chamber, at least one inflatable rear chamber, and at least one inflatable middle chamber, said at least one front chamber and said at least one rear chamber each having an inflation fluid inlet positioned near an upper edge of said inflatable vehicle occupant protection device and an inflation fluid outlet located near a lower edge of said inflatable vehicle occupant protection device, said at least one middle chamber having an arc-shaped configuration defined by spaced arc-shaped connections, said arc-shaped connections having opposite ends positioned near said lower edge which define inflation fluid inlets of said at least one middle chamber, said inflation fluid inlets of said at least one middle chamber being positioned near said lower edge, said at least one middle chamber being free from an inflation fluid inlet and outlet near said upper edge, said inflation fluid inlets of said front and rear chambers directing inflation fluid from said inflation fluid source into said front and rear chambers, said inflation fluid outlets of said front and rear chambers directing inflation fluid from said front and rear chambers into said inflation fluid inlets of said at least one middle chamber to inflate said at least one middle chamber.

2. Apparatus as defined in claim 1, wherein said at least one front chamber and said at least one rear chamber begin to inflate before said at least one middle chamber begins to inflate.

3. Apparatus as defined in claim 1, wherein said at least one front chamber and said at least one rear chamber are substantially inflated before said at least one middle chamber begins to inflate.

4. Apparatus as defined in claim 1, wherein said at least one connection comprises at least one front connection that helps to define said at least one front chamber and at least one rear connection that helps to define said at least one rear chamber.

5. Apparatus as defined in claim 4, wherein said at least one front connection and said at least one rear connection include portions that direct said inflation fluid out of said at least one front chamber and out of said at least one rear chamber, respectively, through said inflation fluid outlets towards said at least one middle chamber.

6. Apparatus as defined in claim 1, further comprising at least one breakable connection interconnecting said overlying panels, said at least one breakable connection breaking and disconnecting said overlying panels when said inflatable vehicle occupant protection device is inflated.

7. Apparatus as defined in claim 6, wherein said inflatable vehicle occupant protection device has an inflatable volume that increases when said at least one breakable connection breaks and said overlying panels move away from each other.

8. Apparatus as defined in claim 6, wherein said at least one breakable connection helps to define said at least one front chamber, said at least one breakable connection breaking when inflation fluid pressure within said at least one front chamber reaches a predetermined level.

9. Apparatus as defined in claim 6, wherein said inflation fluid enters said at least one inflation fluid inlet of said at least one middle chamber to inflate said at least one middle chamber when said at least one breakable connection breaks.

10. Apparatus as defined in claim 6, wherein said at least one breakable connection helps to define said at least one rear chamber, said at least one breakable connection breaking when inflation fluid pressure within said at least one rear chamber reaches a predetermined level.

11. Apparatus as defined in claim 4, wherein said at least one front connection and said at least one rear connection have a round shape.

12. Apparatus as defined in claim 4, wherein at least one front connection and said at least one rear connection have a curved shape.

13. Apparatus as defined in claim 1, wherein said inflatable vehicle occupant protection device is an inflatable curtain having a stored position extending along the side structure adjacent a roof of the vehicle.

14. Apparatus as defined in claim 13, further including a fill tube having a portion located in said inflatable vehicle occupant protection device along said upper edge of said inflatable vehicle occupant protection device, said inflation fluid source being in fluid communication with said fill tube, said inflation fluid source, when actuated, providing inflation fluid to said fill tube, said fill tube directing said inflation fluid into said inflation fluid inlet of said at least one front chamber and of said at least one rear chamber to inflate said inflatable vehicle occupant protection device.

15. Apparatus as defined in claim 14, wherein said inflatable vehicle occupant protection device includes a pocket for receiving an end portion of said fill tube, said pocket surrounding said end portion of said fill tube and forming a snug fit with said end portion of said fill tube, said pocket helping to position said fill tube relative to said inflatable vehicle occupant protection device.

16. Apparatus as defined in claim 14, wherein said at least one connection comprises at least one front connection that helps to define said at least one front chamber, at least one rear connection that helps to define said at least one rear chamber, and at least one middle connection that helps to define said at least one middle chamber, portions of said front, rear and middle connections helping to position said fill tube relative to said inflatable vehicle occupant protection device.

17. Apparatus as defined in claim 1, wherein said inflatable vehicle occupant protection device when inflated extends along the side structure of the vehicle between an A pillar and a C pillar of the vehicle.

18. Apparatus as defined in claim 1, wherein said inflatable vehicle occupant protection device, when inflated, overlies at least a portion of an A pillar, a B pillar and a C pillar of the vehicle.

19. Apparatus as defined in claim 1, further comprising a sensor for sensing a vehicle condition for which deployment of said inflatable vehicle occupant protection device is desired, said sensor actuating said inflation fluid source to provide inflation fluid to inflate said inflatable vehicle occupant protection device.

20. Apparatus as defined in claim 1, wherein said inflation fluid source comprises an inflator that is actuatable to inflate said inflatable vehicle occupant protection device.

21. Apparatus as recited in claim 1, wherein said at least one middle chamber is inflated by inflation fluid entering said middle chambers through said inflation fluid inlets at opposite ends of said at least one middle chamber simultaneously.

22. Apparatus for helping to protect an occupant of a vehicle that has a side structure and a roof, said apparatus comprising:
  an inflatable vehicle occupant protection device that is inflatable away from the vehicle roof into a position between the side structure of the vehicle and a vehicle occupant, said inflatable vehicle occupant protection device comprising overlying panels interconnected to form a perimeter connection extending along a perimeter of said inflatable vehicle occupant protection device, said perimeter being at least partially defined by upper and lower edges of said inflatable vehicle occupant protection device and front and rear portions spaced apart along said upper and lower edges, said inflatable vehicle occupant protection device including at least one connection interconnecting said overlying panels within said perimeter and at least one breakable connection interconnecting said overlying panels within said perimeter; and
  an inflation fluid source that provides inflation fluid for inflating said inflatable vehicle occupant protection device;
  said at least one connection helping to define at least one inflatable front chamber located in said front portion, at least one inflatable rear chamber located in said rear portion and at least one inflatable middle chamber located between said at least one front chamber and said at least one rear chamber,
  said inflation fluid source directing inflation fluid into said at least one front chamber and said at least one rear chamber, said at least one breakable connection breaking when inflation fluid pressure in said inflatable vehicle occupant protection device reaches a predetermined level, said inflation fluid being directed into said at least one middle chamber when said at least one breakable connection breaks to inflate said at least one middle chamber.

23. Apparatus for helping to protect an occupant of a vehicle that has a side structure and a roof, said apparatus comprising:
  an inflatable vehicle occupant protection device that is inflatable away from the vehicle roof into a position between the side structure of the vehicle and a vehicle occupant; and
  an inflation fluid source that provides inflation fluid for inflating said inflatable vehicle occupant protection device;
  said inflatable vehicle occupant protection device comprising overlying panels interconnected to form said inflatable vehicle occupant protection device, said inflatable vehicle occupant protection device including connect ions that interconnect said panels to define at least one front chamber, at least one rear chamber, and at least one middle chamber of said inflatable vehicle occupant protection device and further including at least one breakable connection that interconnects said panels and helps to define said at least one front chamber,
  said at least one front chamber and said at least one rear chamber each having an inflation fluid inlet positioned near an upper edge of said inflatable vehicle occupant protection device and an inflation fluid outlet located near a lower edge of said inflatable vehicle occupant protection device, said at least one middle chamber having at least one inflation fluid inlet positioned near said lower edge of said inflatable vehicle occupant protection device and being free from an inflation fluid inlet and outlet near said upper edge of said inflatable vehicle occupant protection device, said inflation fluid inlets directing inflation fluid from said inflation fluid source into said front and rear chambers, said inflation fluid outlets directing inflation fluid from said front and rear chambers into said at least one inflation fluid inlet of said at least one middle chamber, said at least one breakable connection breaking when inflation fluid pressure within said at least one front chamber reaches a predetermined level.

24. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant; and an inflation fluid source that provides inflation fluid for inflating said inflatable vehicle occupant protection device;

said inflatable vehicle occupant protection device comprising overlying panels interconnected to form said inflatable vehicle occupant protection device, said inflatable vehicle occupant protection device including connections that interconnect said panels to define at least one front chamber, at least one rear chamber, and at least one middle chamber of said inflatable vehicle occupant protection device and further including at least one breakable connection that interconnects said panels and helps to define said at least one rear chamber, said at least one front chamber and said at least one rear chamber each having an inflation fluid inlet positioned near an upper edge of said inflatable vehicle occupant protection device and an inflation fluid outlet locate near a lower edge of said inflatable vehicle occupant protection device, said at least one middle chamber having at least one inflation fluid inlet positioned near said lower edge of said inflatable vehicle occupant protection device and being free from an inflation fluid inlet and outlet near said upper edge of said inflatable vehicle occupant protection device, said inflation fluid inlets directing inflation fluid from said inflation fluid source into said front and rear chambers, said inflation fluid outlets directing inflation fluid from said front and rear chambers into said at least one inflation fluid inlet of said at least one middle chamber, said at least one breakable connection breaking when inflation fluid pressure within said at least one rear chamber reaches a predetermined level.

25. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant; and an inflation fluid source that provides inflation fluid for inflating said inflatable vehicle occupant protection device;

said inflatable vehicle occupant protection device comprising overlying panels interconnected to form said inflatable vehicle occupant protection device, said inflatable vehicle occupant protection device including connections that interconnect said panels to define at least one front chamber, at least one rear chamber, and at least one middle chamber of said inflatable vehicle occupant protection device and further including at least one breakable connection that interconnects said panels adjacent respective ones of said inflation fluid inlets of said at least one middle chamber, said at least one front chamber and said at least one rear chamber each having an inflation fluid inlet positioned near an upper edge of said inflatable vehicle occupant protection device and an inflation fluid outlet located near a lower edge of said inflatable vehicle occupant protection device, said at least one middle chamber having at least one inflation fluid inlet positioned near said lower ledge of said inflatable vehicle occupant protection device and being free from an inflation fluid inlet and outlet near said upper edge of said inflatable vehicle occupant protection device, said inflation fluid inlets directing inflation fluid from said inflation fluid source into said front and rear chambers, said inflation fluid outlets directing inflation fluid from said front and rear chambers into said at least one inflation fluid inlet of said at least one middle chamber, said at least one breakable connection breaking when inflation fluid pressure reaches a predetermined level, said inflation fluid flowing through said respective ones of said inflation fluid inlets when said at least one breakable connection breaks.

* * * * *